3,258,418
PRODUCTION OF HIGH PENETRATION AND
HIGH SOFTENING POINT ASPHALT
Armin C. Pitchford, William N. Axe, and Gene N. Woodruff, Bartlesville, Okla., assignors to Phillips Petroleum Company, a corporation of Delaware
Filed Mar. 21, 1963, Ser. No. 266,990
4 Claims. (Cl. 208—44)

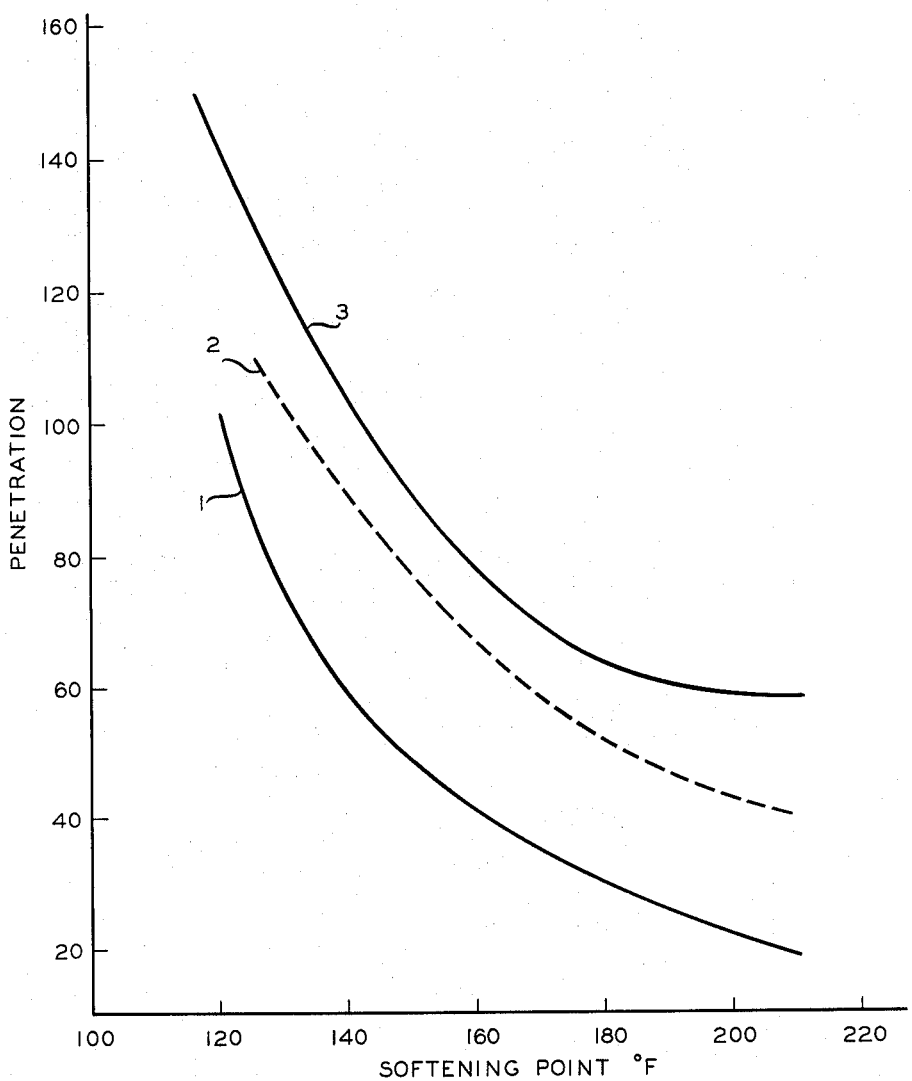

This invention relates to a process for the production of an improved asphaltic material. In another aspect, this invention relates to a process for the production of an asphalt having a high penetration and a high softening point.

Resistance to changes in properties such as penetration, ductility and softening point with changes in temperature is a desirable characteristic of asphaltic materials which are employed as roofing materials, canal linings, pipeline coatings, electrical insulating materials, etc. It is desirable that such asphaltic materials not become excessively hard, brittle or soft over moderate ranges of ambient temperatures. It is conventional to raise the softening point of an asphalt by air blowing the asphalt. Such an asphalt has a higher softening point for a given penetration than an asphalt produced from the same feedstock by vacuum reduction or solvent extraction. However, the process of air blowing the asphalt substantially reduces the penetration of the asphalt, producing a product with a high softening point but having an undesirable low penetration.

Accordingly, an object of our invention is to provide a process for the production of an asphalt having a high softening point and relatively high penetration.

Another object of our invention is to provide a process for increasing the softening point of asphalts.

Another object of our invention is to provide an improved process for increasing the softening point of an asphalt whereby the penetration of the product asphalt is improved.

Other objects, advantages and features of our invention will be readily apparent to those skilled in the art from the following description and the appended claims.

Briefly, the process comprises admixing a halide with an asphalt at an elevated temperature and in a non-oxidizing atmosphere.

Asphalt, as the term is hereinafter employed, refers to a residual fraction obtained upon the distillation of petroleum crude oils. The process of this invention is applicable to asphalts having a penetration in the range of 25 to 300+ as determined by test method ASTM D5–61, and particularly for asphalts having a penetration in the range of 150–250.

The asphalt is admixed at an elevated temperature with a halide selected from the group comprising the fluorides, chlorides, bromides and iodides of zinc, iron, copper, cobalt, nickel, cadmium and mercury. The amount of halide added to the asphalt material is in the range from 0.2 to 5 weight percent normally, although it is within the scope of this invention to employ higher concentrations of the halide.

Conventional mechanical means of agitating the mixture can be employed. Agitation can also be provided by a stream of non-reactive gas such as natural gas, refinery residue gas, or the like. Furnace flue gas substantially free of oxidizing components or other non-reactive gas can also be employed.

The asphalt and halide are mixed at an elevated temperature in the range of 300 to 550° F., and preferably at a temperature in the range of from 350 to 475° F. The mixing or reaction time employed will range from 10 minutes to 48 hours, although a reaction time in the range of 1 to 48 hours is normally employed, and preferably a reaction time in the range from 2 to 24 hours is utilized. The reaction time and reaction temperature are correlated in the hereinafter described manner to achieve the desired change of properties—penetration and softening point—of the asphalt.

As previously noted, asphalts having high softening points are desirable. Conventional processes for producing asphalts having high softening points also result in the production of asphalts with undesirable low penetrations.

Referring to the drawing, curve 1 illustrates the change in penetration of a 215 penetration asphalt obtained from a Western Kansas crude oil when the softening point was raised by passing air through a 500-gram sample of the 215 penetration asphalt at the rate of 2.8 liters/minute, maintaining an air blowing temperature of 485° F. When the softening point of the asphalt was raised to 210° F. determined by ring and ball test method ASTM D36–26, the penetration of the asphalt was lowered to 19.

Curve 2 of the drawing illustrates the results obtained when 500 grams of the same 215 penetration asphalt containing 3.0 weight percent zinc chloride was air blown at 485° F. with air at the rate of 2.8 liters/minute. It was noted that when the softening point was raised to 210° F. the penetration was lowered to 40.

Curve 3 of the drawing illustrates the results obtained when a reaction mixture comprising 500 grams of the same 215 penetration asphalt containing 2.0 weight percent zinc chloride was agitated at a temperature of 390° F. with methane passed through the asphalt at the rate of 2.8 liters/minute in a non-oxidizing atmosphere. At 210° F. softening point the product asphalt had a penetration of 58. This represents a substantial increase in penetration over the product asphalts obtained by air blowing alone or by air blowing plus zinc chloride.

As will be evident to those skilled in the art, various modifications of this invention can be made, or followed, in view of the foregoing disclosure and discussion without departing from the spirit or scope thereof.

We claim:
1. A process which comprises admixing an asphalt with a halide selected from the group consisting of the halides of zinc, iron, copper, cobalt, nickel, cadmium and mercury in a temperature range of 300° F. to 550° F. and in a hydrocarbon atmosphere.

2. The process of claim 1 wherein said asphalt has a penetration in the range of 25 to 300+.

3. A process which comprises contacting an asphalt with a halide selected from the group consisting of the halides of zinc, iron, copper, cobalt, nickel, cadmium and mercury in a temperature range of 300° F. to 550° F., and passing a hydrocarbon gas through the formed mixture.

4. The process of claim 3 wherein said halide is zinc chloride and said hydrocarbon is methane.

References Cited by the Examiner
UNITED STATES PATENTS
1,720,487    7/1929    Lichenstern _____ 106—246
(Other references on following page)

UNITED STATES PATENTS

| 2,247,375 | 7/1941 | Hersberger | 208—44 |
| 2,287,511 | 6/1942 | Burk et al. | 208—44 |
| 2,864,760 | 12/1958 | Croy | 208—44 |

FOREIGN PATENTS

| 397,699 | 8/1933 | Great Britain. |
| 827,485 | 2/1960 | Great Britain. |

References Cited by the Applicant

FOREIGN PATENTS 506,665  10/1954  Canada.

DANIEL E. WYMAN, *Primary Examiner.*

ALPHONSO D. SULLIVAN, *Examiner.*

H. LEVINE, P. E. KONOPKA, *Assistant Examiners.*